United States Patent
Abe et al.

(10) Patent No.: US 10,016,832 B2
(45) Date of Patent: Jul. 10, 2018

(54) MACHINING PATH DRAWING APPARATUS FOR WIRE ELECTRIC DISCHARGE MACHINE

(71) Applicant: FANUC Corporation, Yamanashi (JP)

(72) Inventors: Hiroyuki Abe, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 118 days.

(21) Appl. No.: 14/729,920

(22) Filed: Jun. 3, 2015

(65) Prior Publication Data

US 2015/0352647 A1    Dec. 10, 2015

(30) Foreign Application Priority Data

Jun. 4, 2014    (JP) .................................. 2014-115947

(51) Int. Cl.
| | | |
|---|---|---|
| *B23H 7/06* | (2006.01) | |
| *B23H 7/20* | (2006.01) | |
| *G05B 19/4068* | (2006.01) | |

(52) U.S. Cl.
CPC .............. *B23H 7/06* (2013.01); *B23H 7/065* (2013.01); *B23H 7/20* (2013.01); *G05B 19/4068* (2013.01); *G05B 2219/45043* (2013.01)

(58) Field of Classification Search
CPC . B23H 7/06; B23H 7/20; B23H 7/065; G05B 19/4068; G05B 2219/45043
See application file for complete search history.

(56) References Cited

U.S. PATENT DOCUMENTS

| | | | |
|---|---|---|---|
| 2003/0216830 A1 | 11/2003 | Hasebe et al. | |
| 2007/0156278 A1* | 7/2007 | Hiraga | G05B 19/406 700/184 |
| 2012/0193326 A1 | 8/2012 | Mitsuyasu | |
| 2014/0014625 A1 | 1/2014 | Yamaoka et al. | |

(Continued)

FOREIGN PATENT DOCUMENTS

| | | |
|---|---|---|
| DE | 4107527 A1 | 9/1992 |
| DE | 4131650 A1 | 3/1993 |

(Continued)

OTHER PUBLICATIONS

Extended European Search Report dated Oct. 5, 2015, corresponding to European patent application No. 15169400.7.

(Continued)

*Primary Examiner* — William B Partridge
*Assistant Examiner* — Istiaque Ahmed
(74) *Attorney, Agent, or Firm* — Hauptman Ham, LLP

(57) ABSTRACT

A machining path drawing apparatus for a wire electric discharge machine that draws a machining path for the wire electric discharge machine having a core fixation function includes a machining shape information calculation unit for analyzing a machining program to determine machining shape information, a core fixation function operating region detection unit for determining a region where the core fixation function operates in the machining shape information, and a machining path drawing unit for drawing the region where the core fixation function operates with a display attribute changed when a machining path is drawn based on the machining shape information.

8 Claims, 13 Drawing Sheets

(56) References Cited

U.S. PATENT DOCUMENTS

| | | |
|---|---|---|
| 2014/0100688 A1 | 4/2014 | Tezuka et al. |
| 2014/0374385 A1* | 12/2014 | Kawano .................. B23H 7/04 219/69.12 |
| 2015/0094845 A1* | 4/2015 | Inukai ..................... B23H 7/04 700/162 |

FOREIGN PATENT DOCUMENTS

| | | | |
|---|---|---|---|
| JP | 2001318709 A | * | 11/2001 |
| JP | 2012-166332 A | | 9/2012 |
| JP | 2013-144335 A | | 7/2013 |
| JP | 2013144335 A | * | 7/2013 |
| JP | 2014-014907 A | | 1/2014 |
| JP | 2014-024132 A | | 2/2014 |
| JP | 5426733 B2 | | 2/2014 |
| WO | 2013/161043 A1 | | 10/2013 |

OTHER PUBLICATIONS

Office Action dated Oct. 13, 2015, corresponding to Japanese Patent Application No. 2014-115947.

* cited by examiner

```
O0100(SQUARE)
N101 G92X0Y0
N102 G90G01Y10.
N103 X10.
N104 M100
N105 Y-10.
N106 X-10.
N107 M100
N108 Y10.
N109 X0.
N110 Y0.
N111 M30
```

O0200(SQUARE)
N201 G92X0Y0
N202 G90G01Y10.
N203 X10.
N204 Y-10.
N205 X-10.
N206 Y10.
N207 X0.
N208 Y0.
N209 M30

MACHINING PATH DRAWING APPARATUS FOR WIRE ELECTRIC DISCHARGE MACHINE

RELATED APPLICATIONS

The present application claims priority to Japanese Application Number 2014-115947, filed Jun. 4, 2014, the disclosure of which is hereby incorporated by reference herein in its entirety.

BACKGROUND OF THE INVENTION

1. Field of the Invention

The present invention relates to a machining path drawing apparatus for a wire electric discharge machine.

2. Description of the Related Art

FIG. 16 is a flowchart showing a drawing process of related art. A machining block in a machining program is read (S11), a machining shape, a machining distance, and a machining terminal point are calculated based on data on the read machining block (S12), the process of drawing a machining path portion (see FIG. 14) is carried out, and the entire process is then terminated. FIG. 17 shows a result of the drawing in the drawing process of the related art. A display screen of a machining path drawing apparatus formed of a numerical controller or a personal computer that controls a wire electric discharge machine displays an image of a workpiece 1, and the image displays a simulation of machining from a machining start point 3 along a machining path 4 to form a core 2.

On the other hand, a variety of technologies for a wire electric discharge machine having a core fixation function have been proposed. Japanese Patent Laid-Open No. 2012-166332 discloses a method of machining a workpiece with uncut portions in wire electrical discharge machining. The machining method prevents a cutout portion from falling from the workpiece and allows breakage of welded portions by external force to separate the cutout portion without machining the uncut portions in additional electric discharge machining, achieving reduction in machining time and improvement in machining efficiency.

Japanese Patent Laid-Open No. 2014-24132 discloses a machining program editing method and a machining program editing system for a wire electric discharge machine. The abstract of the Japanese Patent Laid-Open No. 2014-24132 describes that a machining program is analyzed to automatically calculate welding lengths, welding locations, and the number of welding locations, ON/OFF instructions of a welding step are automatically inserted into the machining program, and the resultant machining program can be checked on the screen of a persona computer. Further, paragraph [0031] describes that the ON/OFF instructions, which instruct whether or not welded portions 20 are formed, are automatically inserted into the machining program so that an NC program is edited (step S8). It is noted that the reference character and the step described above are notation in Japanese Patent Laid-Open No. 2014-24132.

Japanese Patent Laid-Open No. 2014-14907 discloses a wire electric discharge machine and an automatic programming apparatus for the wire electric discharge machine. The abstract of Japanese Patent Laid-Open No. 2014-14907 describes that it can provide a wire electric discharge machine and an automatic programming apparatus for the wire electric discharge machine capable of arbitrarily setting locations where an adhesive material of a minimum amount necessary to fix a core to a workpiece base material is deposited.

Japanese Patent Laid-Open No. 2013-144335 discloses a machining program generation apparatus for a wire electric discharge machine. The abstract of Japanese Patent Laid-Open No. 2013-144335 describes that it provides a machining program generation apparatus for a wire electric discharge machine capable of causing a constituent material that forms a wire electrode to adhere to a core with no complicated work.

When a worker performs machining with a core fixation function by using a wire electric discharge machine, the worker desires in some cases to check whether a core is fixed with no problem based, for example, on whether or not the core fixation function has been caused to operate, the position where the core fixation function is caused to operate, the distance over which the core fixation function is caused to operate, and the number of locations where the core fixation function is caused to operate. To check how machining is performed, "drawing," "reference to a machining program and settings," or "simulated operation using dry run" is typically used. Since the core fixation function is caused to operate during machining but the "drawing" does not allow display of how the core fixation function is operating, how the core fixation function is operating cannot be checked.

The "reference to a machining program and settings" allows checking of whether the core fixation function is caused to operate when a code that instructs the core fixation function is present in the machining program. To evaluate whether the core is sufficiently fixed, it is necessary to further check a relative position of a core fixation function operating portion in consideration of the size and the center of gravity of the core. It is, however, difficult for the worker to estimate the check points described above only on the machining program. Further, the same holds true for a case where the core fixation function is also caused to operate in accordance with settings as well as an instruction from the machining program, and it is difficult to evaluate whether the core is sufficiently fixed. The "simulated operation using dry run" allows checking of whether the core fixation function is actually operating, but it is difficult to evaluate whether the core is sufficiently fixed, as in the cases described above.

The machining method disclosed in Japanese Patent Laid-Open No. 2012-166332 relates to actual operation of the core fixation function, and Japanese Patent Laid-Open No. 2012-166332 does not disclose a technology for checking how the core fixation function operates in the form of drawing. In Japanese Patent Laid-Open No. 2014-24132, an NC program is automatically edited only for switching the core fixation function between in-operation and not in-operation, and Japanese Patent Laid-Open No. 2014-24132 does not disclose a technology for checking how the core fixation function operates in the form of drawing. Paragraph [0045] in Japanese Patent Laid-Open No. 2014-14907 describes an example of a program only for causing the core fixation function to operate, and Japanese Patent Laid-Open No. 2014-14907 does not disclose a technology for checking how the core fixation function operates in the form of drawing. Paragraph [0030] in Japanese Patent Laid-Open No. 2013-144335 describes that a machining program is generated based on shape data on a core A generated in step S20 and adhesion regions B set in step S6. The description, however, relates to automatic generation of an NC program but to execution of the core fixation function, and Japanese Patent Laid-Open No. 2013-144335 does not disclose a technology for checking how the core fixation function operates in the form of drawing.

As described above, the related arts have difficulty checking the fixation of a core, and it is expected in the related arts that the checking step is omitted. Under these circumstances, if a machining program including a core fixation function or settings for the core fixation function have an error, the core is cut off and falls and the fallen core greatly damages the machine, undesirably resulting in a significant decrease in productivity.

SUMMARY OF THE INVENTION

In view of the problems with the related arts described above, an object of the present invention is to provide a machining path drawing apparatus for a wire electric discharge machine that performs processing by using a function of fixing a core to a workpiece base material (hereinafter referred to as "core fixation function") and capable of checking how the core fixation function operates in a simulation of the processing in the form of drawing.

A machining path drawing apparatus for a wire electric discharge machine according to the present invention draws a machining path for the wire electric discharge machine configured to, move a wire electrode and a workpiece relative to each other based on an instruction from a machining program, cause the workpiece to undergo electric discharge machining by using discharge produced between the wire electrode and the workpiece, and having a core fixation function of causing adhesion and deposition of machining waste produced by the electric discharge machining to fix a core produced by the electric discharge machining to the workpiece, the machining path drawing apparatus for a wire electric discharge machine including: a machining shape information calculation unit for analyzing the machining program to determine machining shape information; a core fixation function operating region detection unit for determining a region where the core fixation function operates in the machining shape information; and a machining path drawing unit for drawing the region where the core fixation function operates with a display attribute changed when a machining path is drawn based on the machining shape information.

The core fixation function operating region detection unit may determine the region where the core fixation function is caused to operate by analyzing the machining program including an instruction of causing the core fixation function to operate.

The core fixation function operating region detection unit may determine the region where the core fixation function is caused to operate for each predetermined distance along the machining path set by predetermined setting unit by analyzing a machining distance along the machining path.

The core fixation function operating region detection unit may determine the region where the core fixation function is caused to operate by analyzing an initial point, a terminal point, or a middle point of a machining block in the machining program.

The core fixation function operating region detection unit may determine the region where the core fixation function is caused to operate by analyzing intersections where two straight lines that pass through a center of gravity of a machining shape and intersect each other at right angles intersect the machining shape from the machining shape information.

The core fixation function operating region detection unit may determine the region where the core fixation function is caused to operate by analyzing a position separated by a predetermined distance from at least one of an intersection of straight lines of a machining shape, an intersection of a straight line and a curved line of the machining shape, and a point of the machining shape where curvature changes from the machining shape information.

The thus configured present invention can provide a machining path drawing apparatus for a wire electric discharge machine that performs machining by using the core fixation function and capable of checking of how the core fixation function operates in a simulation of the processing in the form of drawing.

BRIEF DESCRIPTION OF THE DRAWINGS

The object and feature of the present invention described above and other objects and features of the present invention will be apparent from the following description of an embodiment with reference to the accompanying drawings.

DETAILED DESCRIPTION OF THE PREFERRED EMBODIMENTS

Figure 1A:
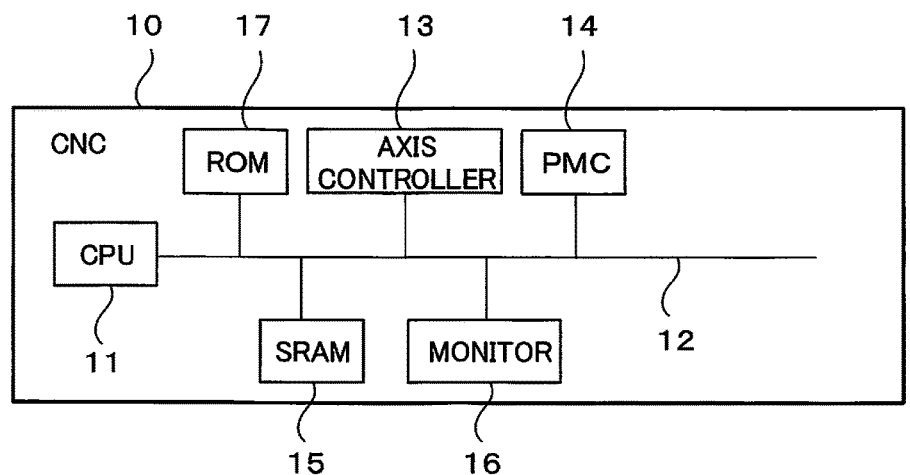
FIGS. 1A and 1B are schematic block diagrams of a machining path drawing apparatus.
Figure 1B:
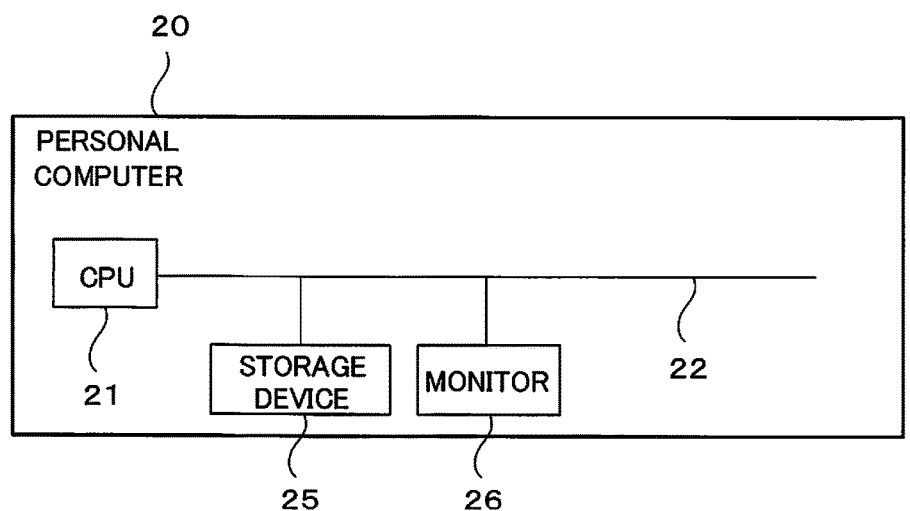

A machining path drawing apparatus for a wire electric discharge machine in an embodiment of the prevent invention allows a worker to readily check how a core fixation function is operating. The machining path drawing apparatus of the present embodiment can be a drawing apparatus in a machining main body or a personal computer or any other external apparatus capable of the computation described above. Further, the drawing display attribute described above only needs to allow identification of a line segment and may be the color, type, thickness, and other factors of a drawn line. FIGS. 1A and 1B are schematic block diagrams of the machining path drawing apparatus for a wire electric discharge machine according to the present invention. FIG. 1A shows an example in which a numerical controller that controls the entire wire electric discharge machine is used to configure the machining path drawing apparatus for a wire electric discharge machine.

A numerical controller 10 is a controller that controls the wire electric discharge machine. A CPU 11 is connected to an axis controller 13, a PMC 14, an SRAM 15, a monitor 16, and a ROM 17 via a bus 12. The CPU 11 reads and analyzes a machining program stored in the SRAM 15, which is kept energized by a power supply and outputs a movement instruction to the axis controller 13, which drives and controls each axis. The axis controller 13 drives and controls each axis motor that is not shown based on the inputted movement instruction. The PMC 14 is a controller that controls a peripheral apparatus around the wire electric discharge machine. The monitor 16 is display unit for displaying the machining program and control data. The ROM 17 stores a program that controls the entire wire electric discharge machine. To use the numerical controller 10, which controls the wire electric discharge machine, as the machining path drawing apparatus for a wire electric discharge machine, the ROM 17 stores machining path drawing process software according to the present invention. The machining path drawing process software is executed by the CPU 11. A result of the drawing process is displayed on the monitor 16.

FIG. 1B shows an example in which a personal computer is used to configure the machining path drawing apparatus for a wire electric discharge machine. A personal computer 20 is connected to a CPU 21, a storage device 25, and a monitor 26 via a bus 22. The storage device 25 stores machining path drawing process software. The CPU 21 executes the machining path drawing process software, and a result of the drawing process is displayed on the monitor 26.

Drawing performed in a machining path drawing apparatus is typically used as unit for checking a machining path. A drawing process of performing drawing is formed of two processes, a drawing process 1) of determining machining shape information from a machining block and a drawing process 2) of drawing a machining path based on the machining shape information.

In the present embodiment, a portion where the core fixation function operates is drawn in the drawn machining path by using a drawing display attribute (color of drawn line, for example) different from that of the machining path to clearly show the portion where the core fixation function operates. As a result, the operation of the core fixation function is, of course, checked, and the relative position of the core fixation function operating portion is shown, whereby the worker can evaluate with no effort whether the core is sufficiently fixed. The drawing process is formed of the following processes:

drawing process 1 of determining machining shape information from a machining block;

drawing process 2 of evaluating based on the machining shape information whether a region of interest is a region where the core fixation function operates;

drawing process 3 of changing the drawing display attribute when a result of the evaluation shows that the region of interest is a region where the core fixation function operates, whereas proceeding to a drawing process 6 when the drawing display attribute is not changed;

drawing process 4 of drawing only the core fixation function operating region by using the changed display attribute;

drawing process 5 of changing the drawing display attribute back to the original; and drawing process 6 of drawing the remaining machining path from the machining shape information.

Figure 2:
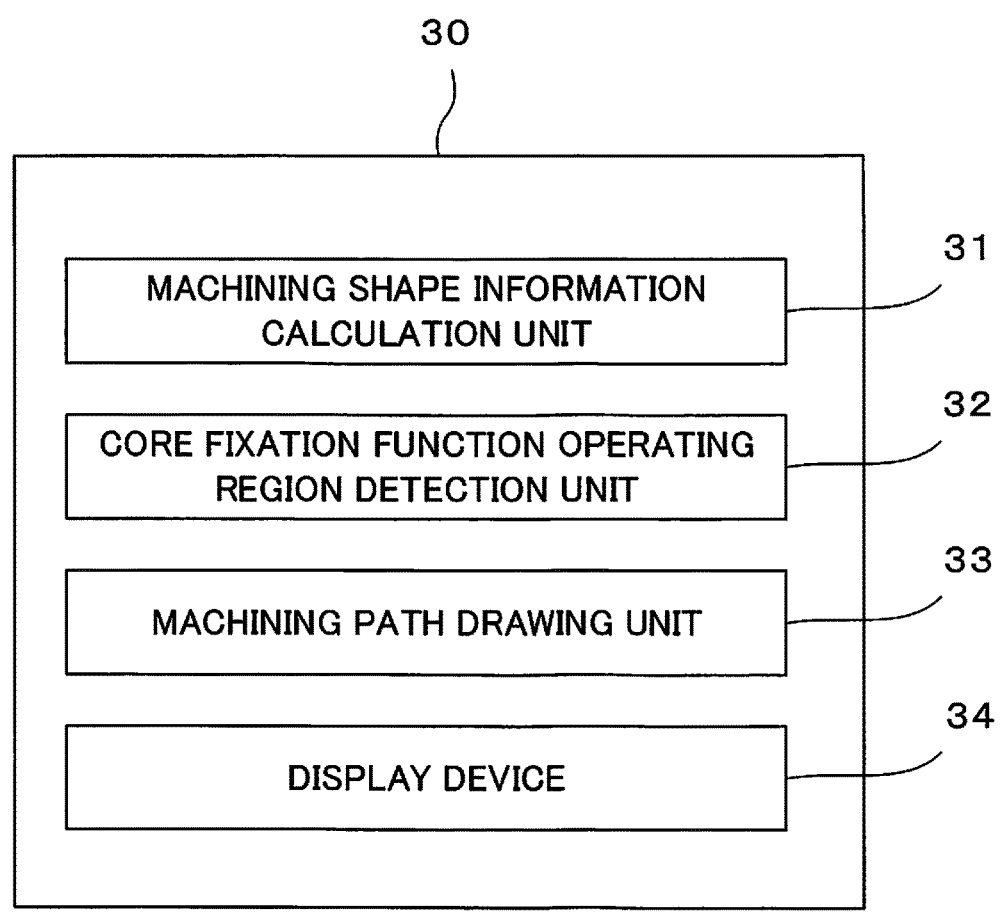
FIG. 2 is a functional block diagram of the machining path drawing apparatus for a wire electric discharge machine according to an embodiment of the invention.

FIG. 2 is a functional block diagram of the machining path drawing apparatus for a wire electric discharge machine according to the present embodiment.

The machining path drawing apparatus for a wire electric discharge machine 30 is a drawing apparatus that draws a machining path for the wire electric discharge machine having a core fixation function of moving a wire electrode and a workpiece relative to each other based on an instruction from a machining program, causing the workpiece to undergo electric discharge machining by using discharge produced between the wire electrode and the workpiece, and causing adhesion and deposition of machining waste produced by the electric discharge machining to fix a core produced by the electric discharge machining to the workpiece.

The machining path drawing apparatus for a wire electric discharge machine 30 includes machining shape information calculation unit 31 for analyzing the machining program to determine machining shape information, a core fixation function operating region detection unit 32 for determining a region where the core fixation function operates in the machining shape information, a machining path drawing unit 33 for drawing the region where the core fixation function operates with a display attribute changed when a machining path is drawn based on the machining shape information, and a display device 34, which displays a result of the drawing performed by the machining path drawing unit 33.

A method for causing the core fixation function to operate will next be described. Primary examples of the method for causing the core fixation function to operate include the following five methods. It is noted that a core fixation distance is fixed at 2 (mm) by way of example.

Figure 3:
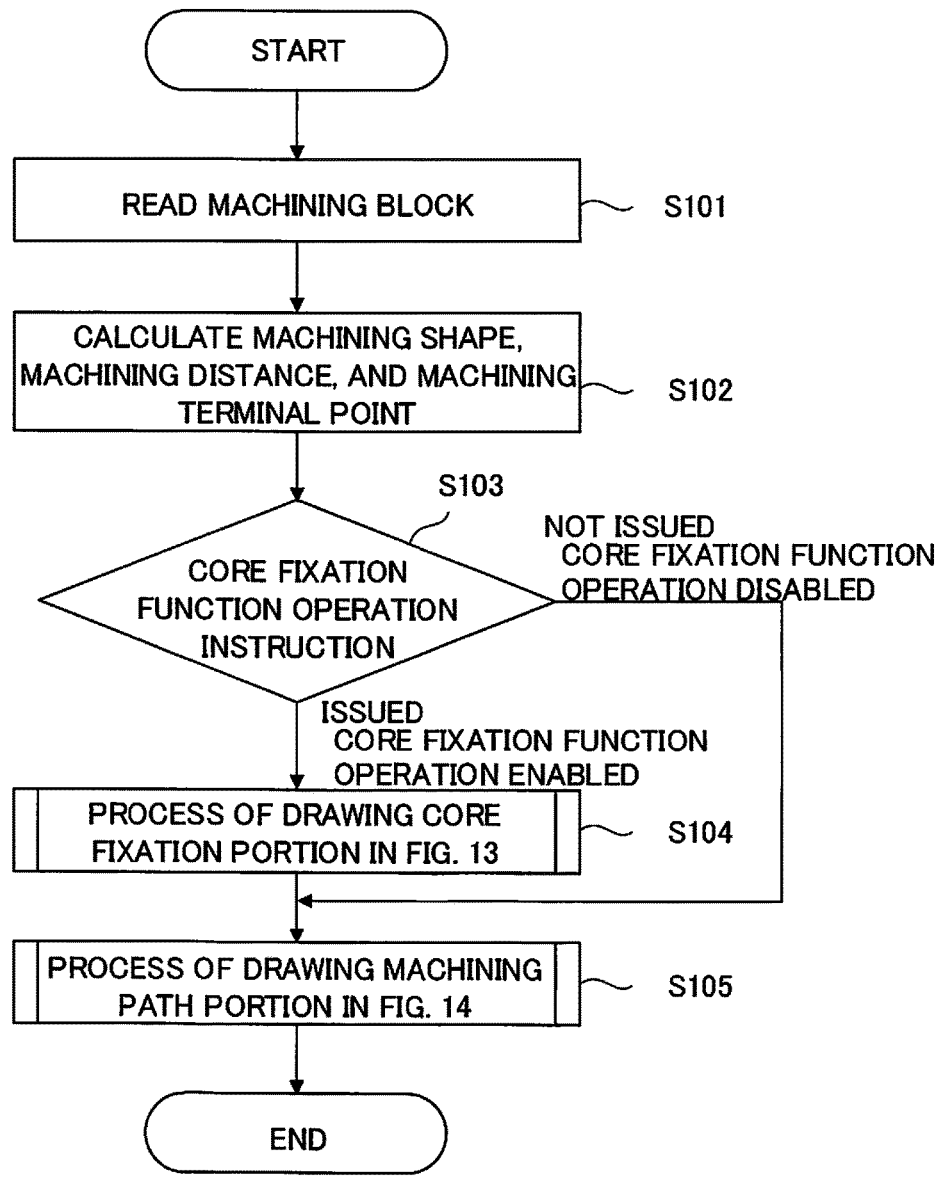
FIG. 3 is a flowchart showing a drawing process in a case where a core fixation function is caused to operate in response to an instruction from a machining program.

Operation method 1) a drawing process in a case where the core fixation function is caused to operate in response to an instruction from the machining program FIG. 3 is a flowchart showing a drawing process in a case where the core fixation function is caused to operate in response to an instruction from the machining program. Each step in the drawing process will be described below.

[Step S101] Read a machining block.

[Step S102] Calculate a machining shape, a machining distance, and a machining terminal point.

[Step S103] Evaluate whether or not a core fixation function operation instruction has been issued, and proceed to step S104 when the operation instruction has been issued, whereas proceeding to step S105 when no operation instruction has been issued.

Figure 13:
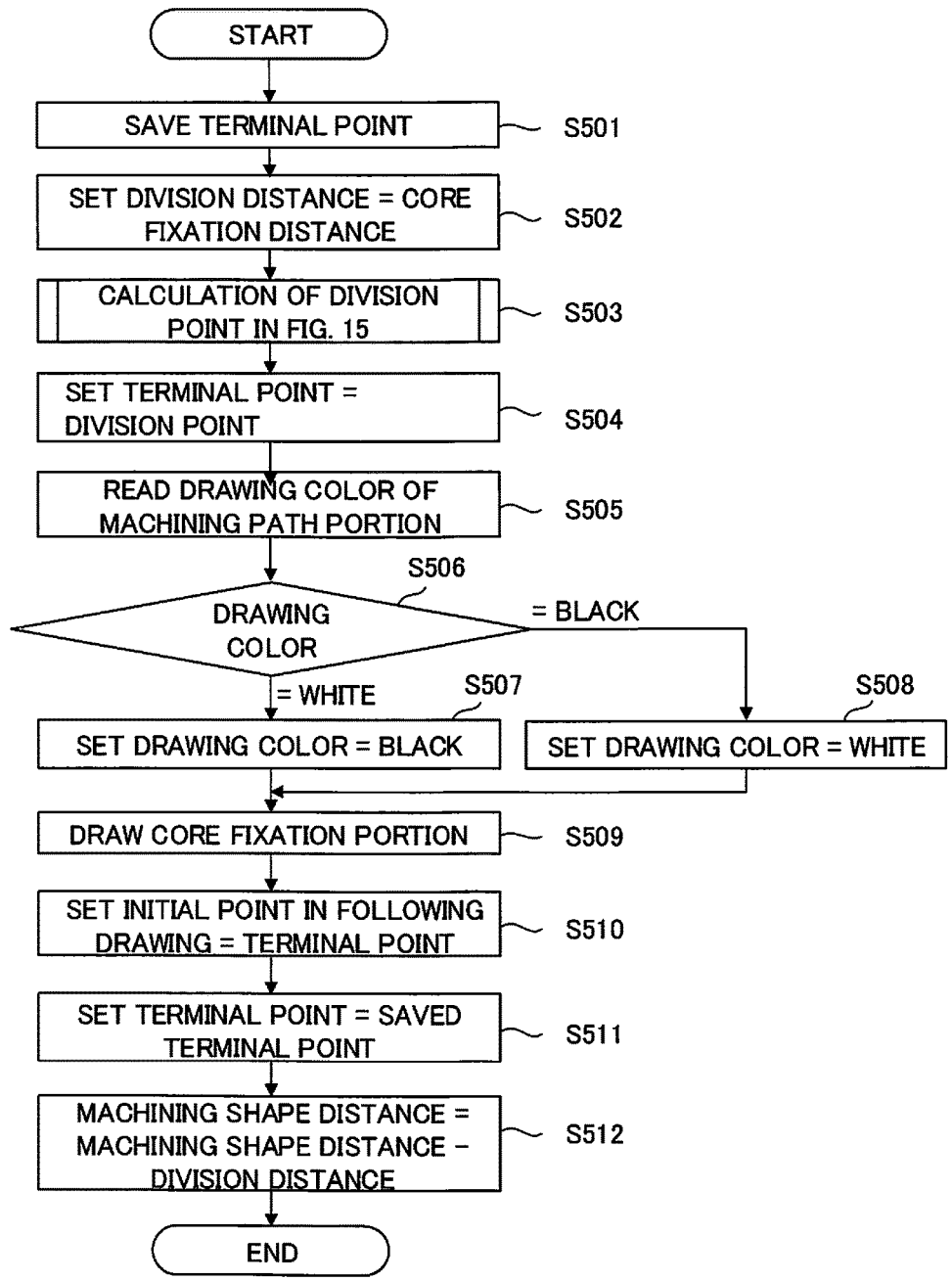
FIG. 13 is a flowchart showing the process of drawing the core fixation portion.

[Step S104] Carry out the process of drawing a core fixation section (see FIG. 13).

[Step S105] Carry out the process of drawing a machining path section (see FIG. 14), and terminate the entire process.

Figures 4, 5:
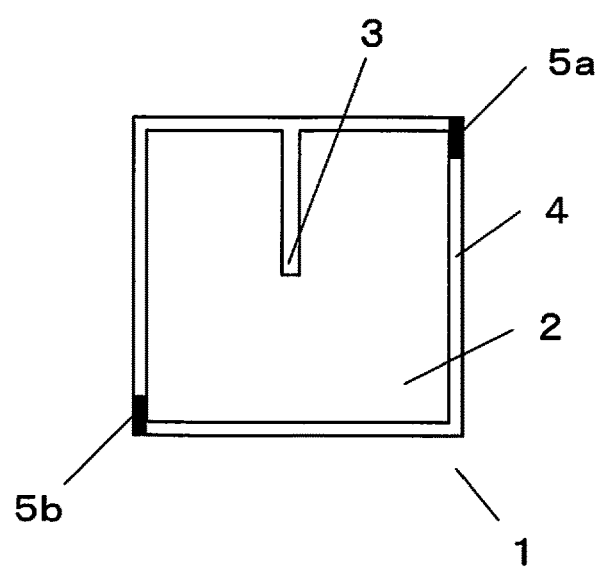
FIG. 4 shows an exemplary program in the case where the core fixation function is caused to operate in response to an instruction from the machining program.
FIG. 5 shows a result of the drawing when the core fixation function is caused to operate in response to an instruction from the machining program.

FIG. 4 is an example of a program in the case where the core fixation function is caused to operate in response to an instruction from the machining program. FIG. 5 shows a result of the drawing when the core fixation function is caused to operate in response to an instruction from the machining program. That is, FIG. 3 shows processes, FIG. 4 shows an exemplary program, and FIG. 5 shows a result of the drawing performed based on the exemplary program. As shown in FIG. 5, core fixation portions 5a and 5b are drawn along the machining path.

In the machining program shown in FIG. 4, an instruction code that causes the core fixation function to operate is called M100 (block N104). Since M100 is not yet executed in a block N103, the core fixation function operation is disabled, and a machining path portion is drawn (S105). Since an instruction of M100 is issued in a block N104, the core fixation function operation is enabled, and the following machining block N105 is drawn as a core fixation portion (S104). A division distance=the core fixation distance=2 (S502).

An initial point (10, 10) and a terminal point (10, −10) lead to a vector (0, −20) (S702). The ratio of the division distance=2 to a machining shape distance=20 leads to a division distance vector (0, −2) (S703). The coordinates of the division are the initial point vector+the division distance vector=(10, 10)+(0, −2)=(10, 8) (S704, S709). A core fixation portion is therefore drawn from (10, 10) to (10, 8) (S104). The point (10, 8) is set to be an initial point of the following drawing (S510), and the machining shape distance=the machining shape distance−the division distance=20−2=18 (S512). A machining path portion is drawn from (10, 8) to (10, −10), which is the remaining path, (S105).

Figure 6:
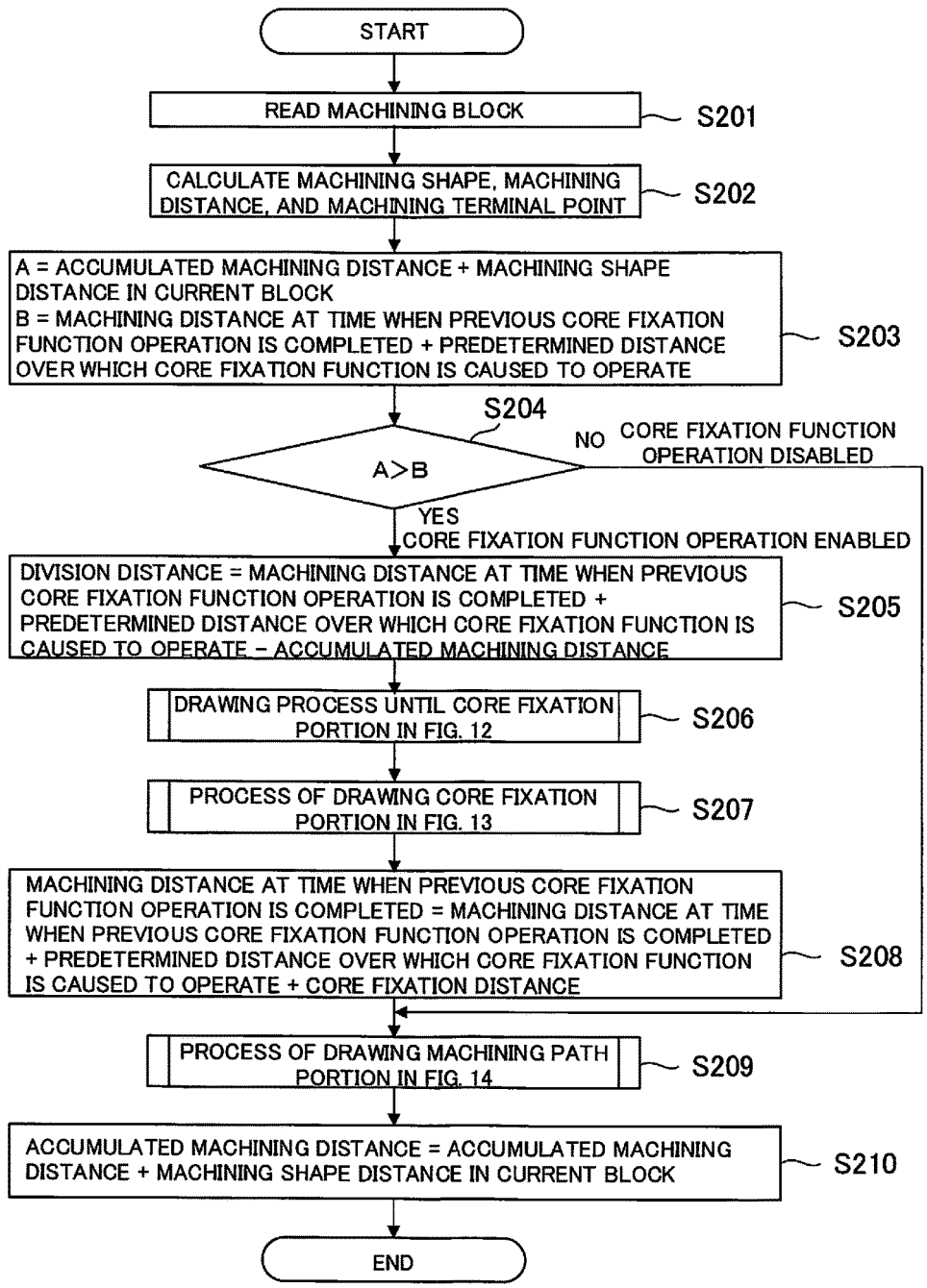
FIG. 6 is a flowchart showing a drawing process in a case where the core fixation function is caused to operate for each predetermined machining distance.

Operation method 2) a drawing process in a case where the core fixation function is caused to operate for each a predetermined machining distance The core fixation function in this method corresponds to the invention according to claim 3 in Japanese Patent No. 5,426,733. The predetermined machining distance may be set as follows: A predetermined value is specified by a machining program; or the machining path drawing apparatus may be provided with a setting unit and an operator may input a predetermined value to the setting unit. FIG. 6 is a flowchart showing a drawing process in the case where the core fixation function is caused to operate for each predetermined machining distance. Each step in the drawing process will be described below.

[Step S201] Read a machining block in a machining program.

[Step S202] Calculate a machining shape, a machining distance, and a machining terminal point.

[Step S203] Add an accumulated machining distance and a machining shape distance in the current block to each other, and call the resultant value A. Add the machining distance at the time when the previous core fixation function operation is completed and the predetermined distance over which the core fixation function is caused to operate to each other and call the resultant value B.

[Step S204] Evaluate whether or not A is greater than B. When A is greater than B (YES), proceed to step S205, whereas when A is not greater than B (NO), proceed to step S209.

[Step S205] Add the predetermined distance over which the core fixation function is caused to operate to the machining distance at the time when the previous core fixation function operation is completed, subtract the accumulated machining distance from the value resulting from the addition, and set the division distance to be the value resulting from the subtraction.

Figure 12:
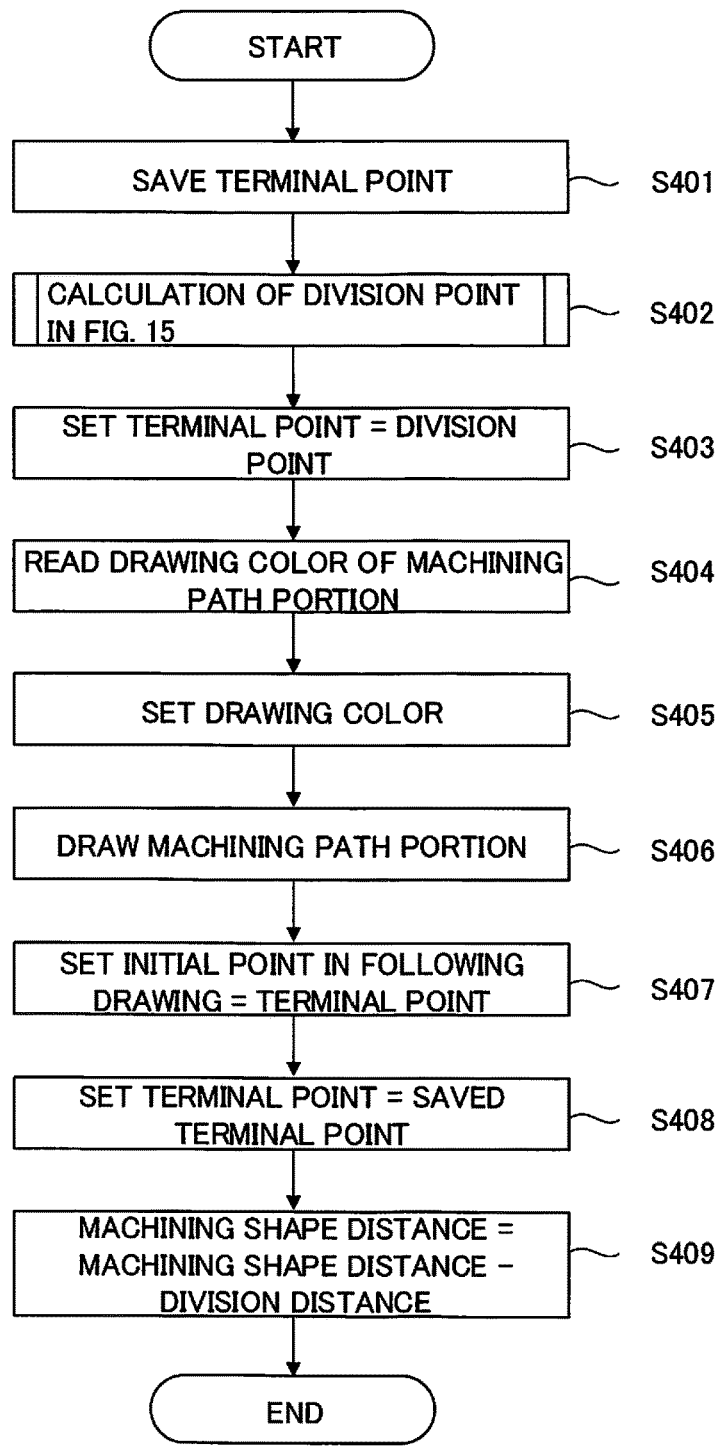
FIG. 12 is a flowchart showing a drawing process until a core fixation portion.

[Step S206] Carry out a drawing process until a core fixation portion (see FIG. 12).

[Step S207] Carry out the process of drawing the core fixation portion (see FIG. 13).

[Step S208] Set the sum of the machining distance at the time when the previous core fixation function operation is completed, the predetermined distance over which the core fixation function is caused to operate, and the core fixation distance to be the machining distance at the time when the previous core fixation function operation is completed.

Figure 14:
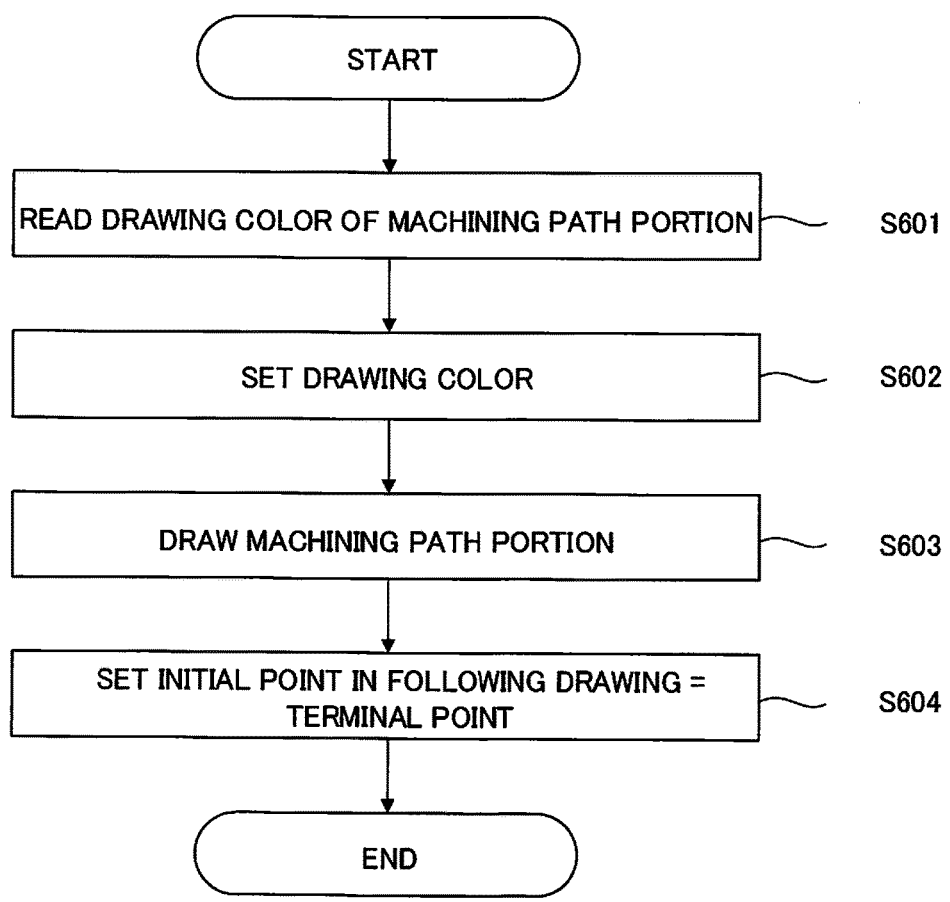
FIG. 14 is a flowchart showing the process of drawing a machining path portion.

[Step S209] Carry out the process of drawing a machining path portion (see FIG. 14).

[Step S210] Add the machining shape distance in the current block to the accumulated machining distance, set the resultant value to be the accumulated machining distance, and terminate the entire process.

Figures 7, 8:
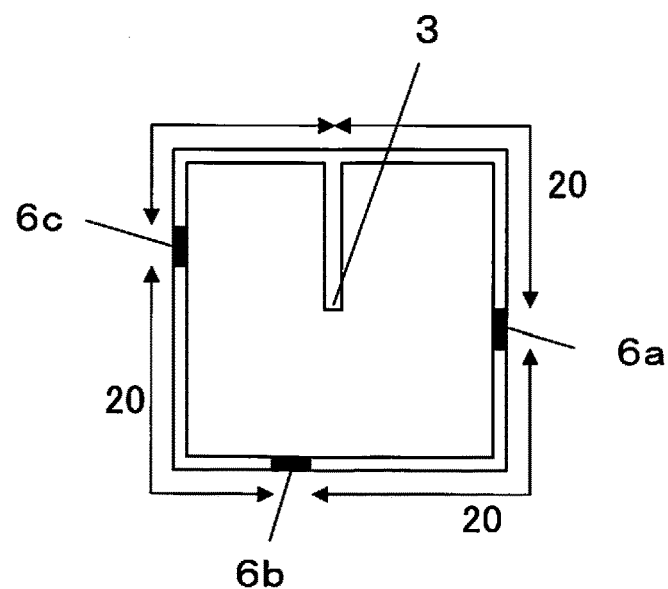
FIG. 7 shows an exemplary machining program in a case where another core fixation function is caused to operate.
FIG. 8 shows a result of the drawing when the core fixation function is caused to operate for each predetermined machining distance.

FIG. 7 shows an exemplary machining program in a case where another core fixation function is caused to operate. FIG. 8 shows a result of the drawing when the core fixation function is caused to operate for each predetermined machining distance. That is, FIG. 6 shows processes, FIG. 7 shows an exemplary program, and FIG. 8 shows a result of the drawing performed based on the exemplary program. As shown in FIG. 8, core fixation portions 6a, 6b, and 6c are drawn along the machining path.

The predetermined distance over which the core fixation function is caused to operate is set at 20. It is assumed in this example that an approach portion (block N202, block N208) is a drawing result that is not added to the accumulated machining distance. In a block N203, A=the accumulated machining distance+the machining shape distance in the current block=0+10, and B=the machining distance at the time when the previous core fixation function operation is completed+the predetermined distance over which the core fixation function is caused to operate=0+20, resulting in A<B. Therefore, the core fixation function operation is disabled, and the block N203 is drawn as a machining path portion (S203, S204).

The accumulated machining distance=the accumulated machining distance+the machining shape distance in the current block=0+10=10 (S210). In a block N204, A=10+20 and B=0+20, resulting in A>B, so that the core fixation function operation is enabled (S203, S204). The division distance=the machining distance at the time when the previous core fixation function operation is completed+the predetermined distance over which the core fixation function is caused to operate−the accumulated machining distance=0+20−10=10 (S205).

First, in the drawing until a core fixation portion, an initial point (10, 10) and a terminal point (10, −10) lead to a vector (0, −20) (S702). The ratio of the division distance=10 to the machining shape distance=20 leads to a division distance vector (0, −10) (S703).

The coordinates of the division are the initial point vector+the division distance vector=(10, 10)+(0, −10)=(10, 0) (S704, S709). The drawing until a core fixation portion is therefore performed from (10, 10) to (10, 0) (S206). The point (10, 0) is set to be an initial point in the following drawing (S407), and the machining shape distance=the machining shape distance−the division distance=20−10=10 (S409).

In the following core fixation portion drawing, the initial point (10, 0) and the terminal point (10, −10) lead to a vector (0, −10) (S702). The ratio of the division distance=the core fixation distance=2 to the machining shape distance=10 leads to a division distance vector (0, −2) (S703). The coordinates of the division are the initial point vector+the division distance vector=(10, 0)+(0, −2)=(10, −2) (S704, S709). A core fixation portion is therefore drawn from (10, 0) to (10, −2) (S207). The point (10, −2) is set to be an initial point in the following drawing (S510), and the machining shape distance=the machining shape distance−the division distance=10−2=8 (S512).

The machining distance at the time when the previous core fixation function operation is completed=the machining distance at the time when the previous core fixation function operation is completed+the predetermined distance over which the core fixation function is caused to operate+the core fixation distance=0+20+2=22 (S208). A machining path portion is drawn from (10, −2) to (10, −10), which is the remaining path, (S209). The accumulated machining distance=the accumulated machining distance+the machining shape distance in the current machining block=10+20 (10+2+8)=30 (S210).

Figure 9:
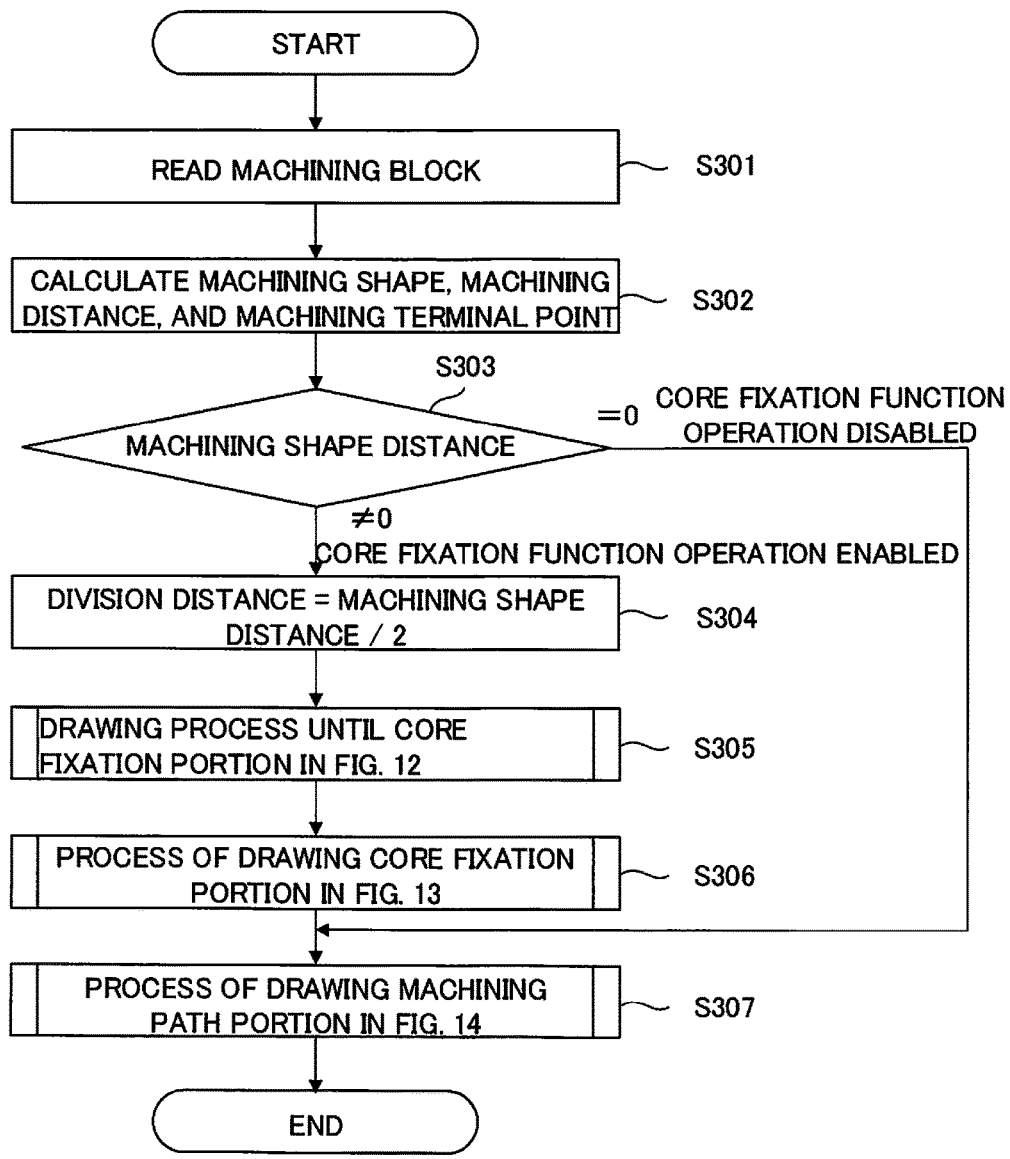
FIG. 9 is a flowchart showing a drawing process in a case where the core fixation function is caused to operate from a middle point of a machining block.

Operation method 3) a drawing process in a case where the core fixation function is caused to operate from an initial point, a terminal point, or a middle point of a machining block FIG. 9 is a flowchart showing a drawing process in a case where the core fixation function is caused to operate from a middle point of a machining block. Each step in the drawing process will be described below.

[Step S301] Read a machining block.

[Step S302] Calculate a machining shape, a machining distance, and a machining terminal point.

[Step S303] Evaluate the machining shape distance, and enable the core fixation function operation and proceed to step S304 when the machining shape distance is not zero, whereas disabling the core fixation function operation and proceeding to step S307 when the machining shape distance is zero.

[Step S304] Divide the machining shape distance by 2 and set the resultant value to be the division distance.

[Step S305] Carry out a drawing process until a core fixation portion (see FIG. 12).

[Step S306] Carry out the process of drawing the core fixation portion (see FIG. 13).

[Step S307] Carry out the process of drawing a machining path portion and terminate the entire process (see FIG. 14).

Figure 10:
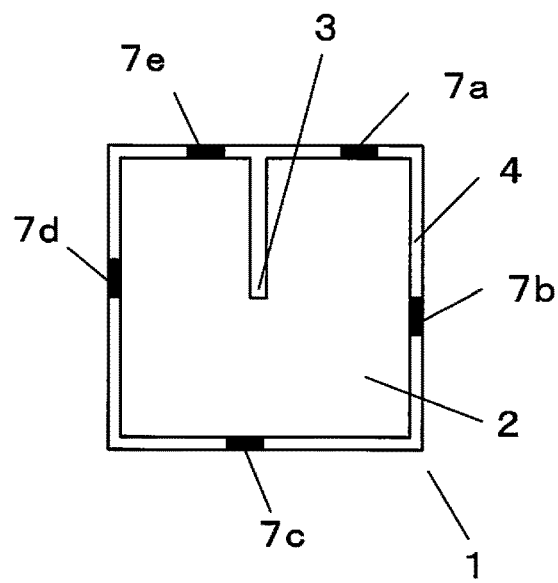
FIG. 10 shows a result of the drawing when the core fixation function is caused to operate from a middle point of a machining block.

FIG. 7 shows an exemplary machining program in a case where another core fixation function is caused to operate. FIG. 10 shows a result of the drawing when the core fixation function is caused to operate from a middle point in a machining block. That is, FIG. 9 shows processes, FIG. 7 shows an exemplary program, and FIG. 10 shows a result of the drawing performed based on the exemplary program.

The core fixation function is caused to operate from a middle point. Core fixation portions 7a, 7b, 7c, 7d, and 7e are drawn along a machining path, as shown in FIG. 10.

The core fixation function is caused to operate from a middle point. It is assumed in this example that an approach portion (block N202, block N208) is a result of the drawing in which the core fixation function is not caused to operate. In a block N203, since the machining shape distance is equal to 10, the core fixation function is caused to operate (S303). The division distance at the middle point is the machining shape distance/2=10/2=5 (S304). First, in the drawing until a core fixation portion, an initial point (0, 10) and a terminal point (10, 10) lead to a vector (10, 0) (S702). The ratio of the division distance=5 to the machining shape distance=10 leads to a division distance vector (5, 0) (S703). The coordinates of the division are the initial point vector+the division distance vector=(0, 10)+(5, 0)=(5, 10) (S704, S709).

The drawing until a core fixation portion (machining path portion) is therefore performed from (0, 10) to (5, 10) (S305). The point (5, 10) is set to be an initial point in the following drawing (S407), and the machining shape distance=the machining shape distance−the division distance=10−5=5 (S409). In the following core fixation portion drawing, the initial point (5, 10) and the terminal point (10, 10) lead to a vector (5, 0) (S702). The ratio of the core fixation distance=the division distance=2 to the machining shape distance=5 leads to a division distance vector (2, 0) (S703).

The coordinates of the division are the initial point vector+the division distance vector=(5, 10)+(2, 0)=(7, 10) (S704, S709). A core fixation portion is therefore drawn from (5, 10) to (7, 10) (S306). A machining path portion is drawn from (7, 10) to (10, 10), which is the remaining path, (S307).

Figure 11:
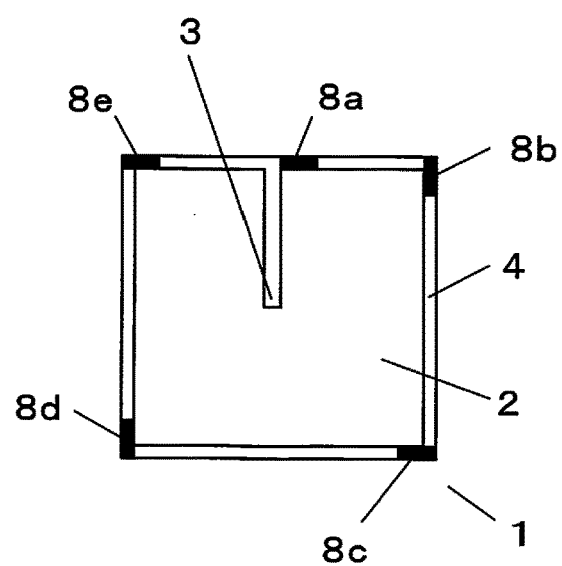
FIG. 11 shows a result of the drawing when the core fixation function is caused to operate from an initial point of a machining block.

In this example, the core fixation function is caused to operate from a middle point. Instead, the core fixation function is allowed to operate from an initial point or a terminal point by changing the division distance (S304) until a core fixation portion. To allow the core fixation function to operate from an initial point, the division distance is set at zero. FIG. 11 shows a result of the drawing in this case. Core fixation portions 8a, 8b, 8c, 8d, and 8e are drawn along a machining path, as shown in FIG. 11.

To complete the operation of the core fixation function at a terminal point, the division distance=the machining shape distance−the core fixation distance. To cause the core fixation function to operate in a central portion of a block, the division distance=(the machining shape distance−the core fixation distance)/2.

Operation method 4) a drawing process in a case where the core fixation function is caused to operate at intersections where two straight lines that pass through the center of gravity of a machining shape and intersect each other at right angles intersect the machining shape The core fixation function in this method corresponds to the invention according to claim 1 in Japanese Patent No. 5,426,733. The operation method 4) can be performed based on the same idea as that for the operation method 2), in which the core fixation function is caused to operate for each predetermined machining distance.

Operation method 5) a drawing process in a case where the core fixation function is caused to operate at a position separated by a predetermined distance from at least one of an intersection of straight lines of a machining shape, an intersection of a straight line and a curved line of the machining shape, and a point of the machining shape where curvature changes The core fixation function in this method corresponds to the invention according to claim 2 in Japanese Patent No. 5,426,733. The operation method 5) can be performed based on the same idea as that for the operation method 3), in which the core fixation function is caused to operate from an initial point or a terminal point.

FIG. 12 describes a drawing process until a core fixation portion.

[Step S401] Save a terminal point.

Figure 15:
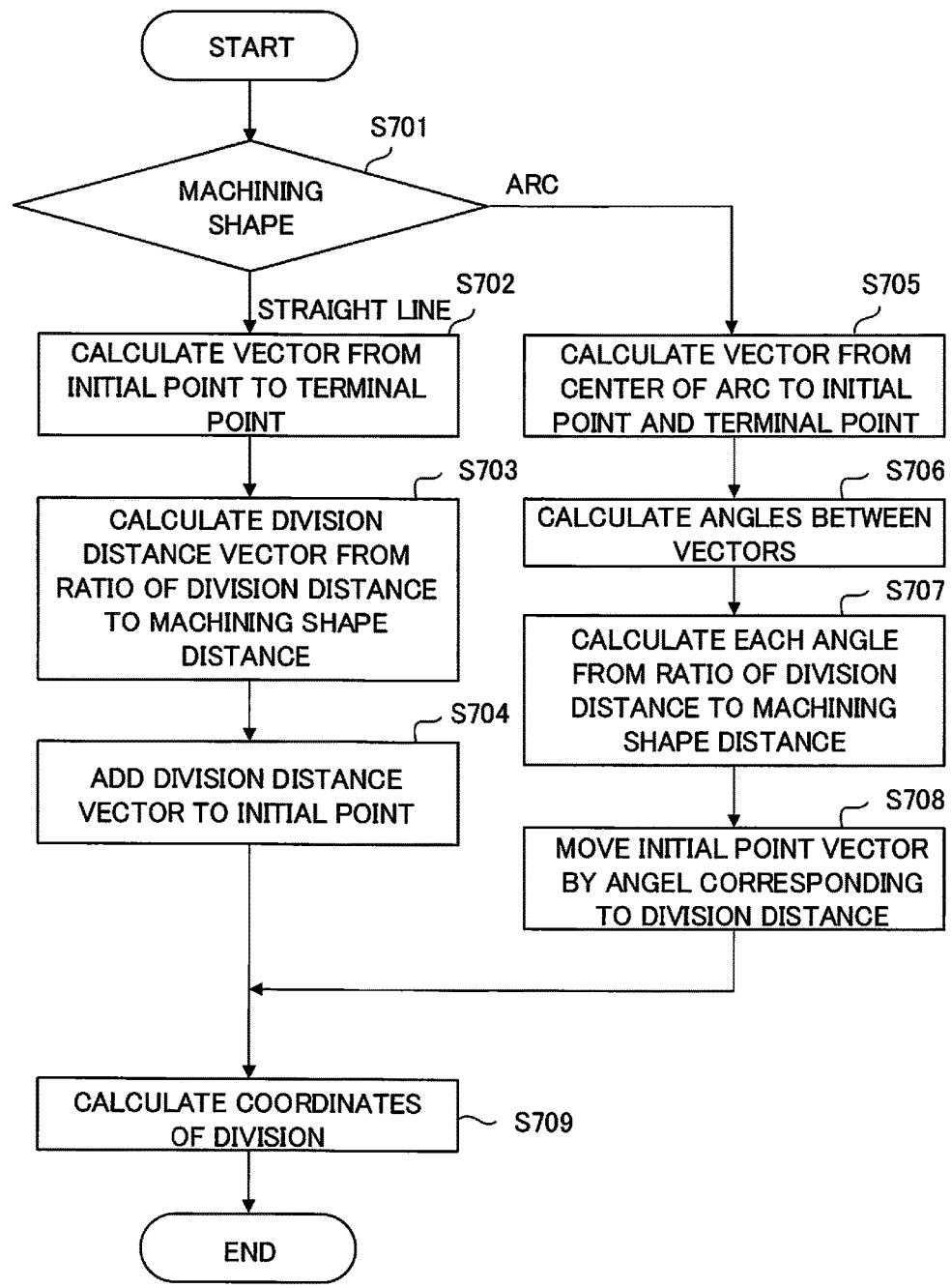
FIG. 15 is a flowchart showing the process of calculating a division point.
Figure 16:
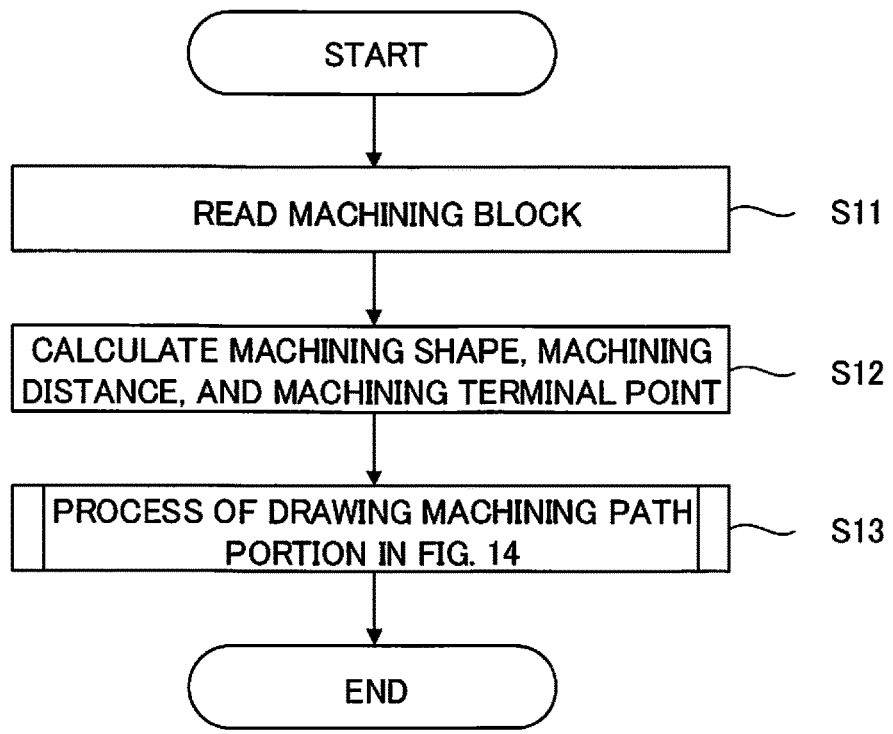
FIG. 16 is a flowchart showing a drawing process of related art.
Figure 17:
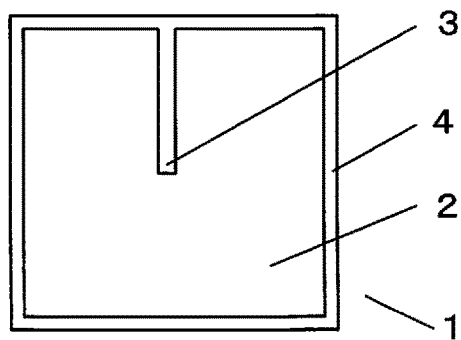
FIG. 17 shows a result of drawing in the drawing process of related art.

[Step S402] Calculate a division point (see FIG. 15).

[Step S403] Set the division point to be the terminal point.

[Step S404] Read a drawing color of a machining path portion.

[Step S405] Set the drawing color.

[Step S406] Draw the machining path portion.

[Step S407] Set the terminal point to be an initial point in the following drawing.

[Step S408] Set the saved terminal point to be the terminal point.

[Step S409] Subtract the division distance from the machining shape distance, set the resultant value to be the machining shape distance, and terminate the entire process.

The process of drawing a core fixation portion will be described with reference to the flowcharts in FIGS. 13, 14, and 15.

FIG. 13 is a flowchart showing the process of drawing a core fixation portion. Each step in the drawing process will be described below.

[Step S501] Save a terminal point.

[Step S502] Set the core fixation distance to be the division distance.

[Step S503] Calculate the division point (see FIG. 15).

[Step S504] Set the division point to be the terminal point.

[Step S505] Read a drawing color of a machining path portion.

[Step S506] Evaluate the drawing color, and proceed to step S507 when the drawing color is white, whereas proceeding to step S508 when the drawing color is black.

[Step S507] Set the drawing color to be black, and proceed to step S509.

[Step S508] Set the drawing color to be white, and proceed to step S509.

[Step S509] Draw a core fixation portion.

[Step S510] Set the terminal point to be an initial point in the following drawing.

[Step S511] Set the saved terminal point to be the terminal point.

[Step S512] Subtract the division distance from the machining shape distance, set the resultant value to be the machining shape distance, and terminate the entire process.

FIG. 14 is a flowchart showing the process of drawing a machining path portion.

[Step S601] Read the drawing color of a machining path portion.

[Step S602] Set the drawing color.

[Step S603] Draw the machining path portion.

[Step S604] Set a terminal point to be an initial point in the following drawing, and terminate the entire process.

FIG. 15 is a flowchart showing the process of calculating a division point.

[Step S701] Evaluate a machining shape, and proceed to step S702 when the machining shape is a straight line, whereas proceeding to step S705 when the machining shape is an arc.

[Step S702] Calculate a vector from an initial point to a terminal point.

[Step S703] Calculate a division distance vector from the ratio of the division distance to the machining shape distance.

[Step S704] Add the division distance vector to the initial point, and proceed to step S709.

[Step S705] Calculate vectors from the center of the arc to an initial point and a terminal point.

[Step S706] Calculate the angles between the vectors.

[Step S707] Calculate each of the angles from the ratio of the division distance to the machining shape distance.

[Step S708] Move the initial point vector by an angle corresponding to the division distance, and proceed to step S709.

The invention claimed is:

1. A machining path drawing apparatus for drawing a machining path for a wire electric discharge machine, the wire electric discharge machine being configured to,
move a wire electrode and a workpiece relative to each other based on an instruction from a machining program, and
machine the workpiece by using electric discharge produced between the wire electrode and the workpiece, and the wire electric discharge machine having a core fixation function of causing adhesion and deposition of machining waste produced by the electric discharge machining to fix a core produced by the electric discharge machining to the workpiece, the machining path drawing apparatus comprising a processor configured to:
analyze the machining program to determine machining shape information,
determine whether the core fixation function is enabled,
in response to a determination that the core fixation function is enabled,
determine, in the machining shape information, a region where the core fixation function operates, and
draw the region where the core fixation function operates with a display attribute changed when a machining path is drawn based on the machining shape information, and
in response to a determination that the core fixation function is disabled,
not to determine the region where the core fixation function operates, and
not to draw the region where the core fixation function operates,
but to draw the machining path based on the machining shape information, wherein the processor is configured to determine whether the core fixation function is enabled in a machining block in the machining program by:
reading the machining block in the machining program,
calculating the machining shape, a machining distance and a machining terminal point,
setting a value A by adding an accumulated machining distance and a machining shape distance in the machining block to each other, wherein the accumulated machining distance is accumulated from a beginning of the machining program to the machining block,
setting a value B by adding a machining distance at a time when a previous core fixation function operation is completed and a predetermined distance over which the core fixation function operates to each other,
determining that the core fixation function is enabled in response to a determination that the value A is greater than the value B, and
determining that the core fixation function is disabled in response to a determination that the value A is not greater than the value B.

2. The machining path drawing apparatus according to claim 1,
wherein the processor is further configured to determine the region where the core fixation function operates by analyzing the machining program including an instruction of causing the core fixation function to operate.

3. The machining path drawing apparatus according to claim 1, wherein the processor is further configured to, for each predetermined distance set along the machining path, determine the region where the core fixation function operates by analyzing a machining distance along the machining path.

4. The machining path drawing apparatus according to claim 1,
wherein the processor is further configured to determine the region where the core fixation function operates by analyzing an initial point, a terminal point, or a middle point of the machining block in the machining program.

5. The machining path drawing apparatus according to claim 1,
wherein the processor is further configured to determine the region where the core fixation function operates by analyzing, from the machining shape information, intersections where two straight lines, which pass through a center of gravity of a machining shape and intersect each other at a right angle, intersect the machining shape.

6. The machining path drawing apparatus according to claim 1,
wherein the processor is further configured to determine the region where the core fixation function operates by analyzing, from the machining shape information, a position separated by a predetermined distance from at least one of
an intersection of straight lines of a machining shape,
an intersection of a straight line and a curved line of the machining shape, and
a point of the machining shape where curvature changes.

7. The machining path drawing apparatus according to claim 1, wherein the display attribute is selected from one of a color and a type of a drawn line.

8. The machining path drawing apparatus according to claim 1, further comprising a display device configured to display the drawing of the machining path performed by the processor in a simulation of the processing of the machining program.

* * * * *